Figure 1:
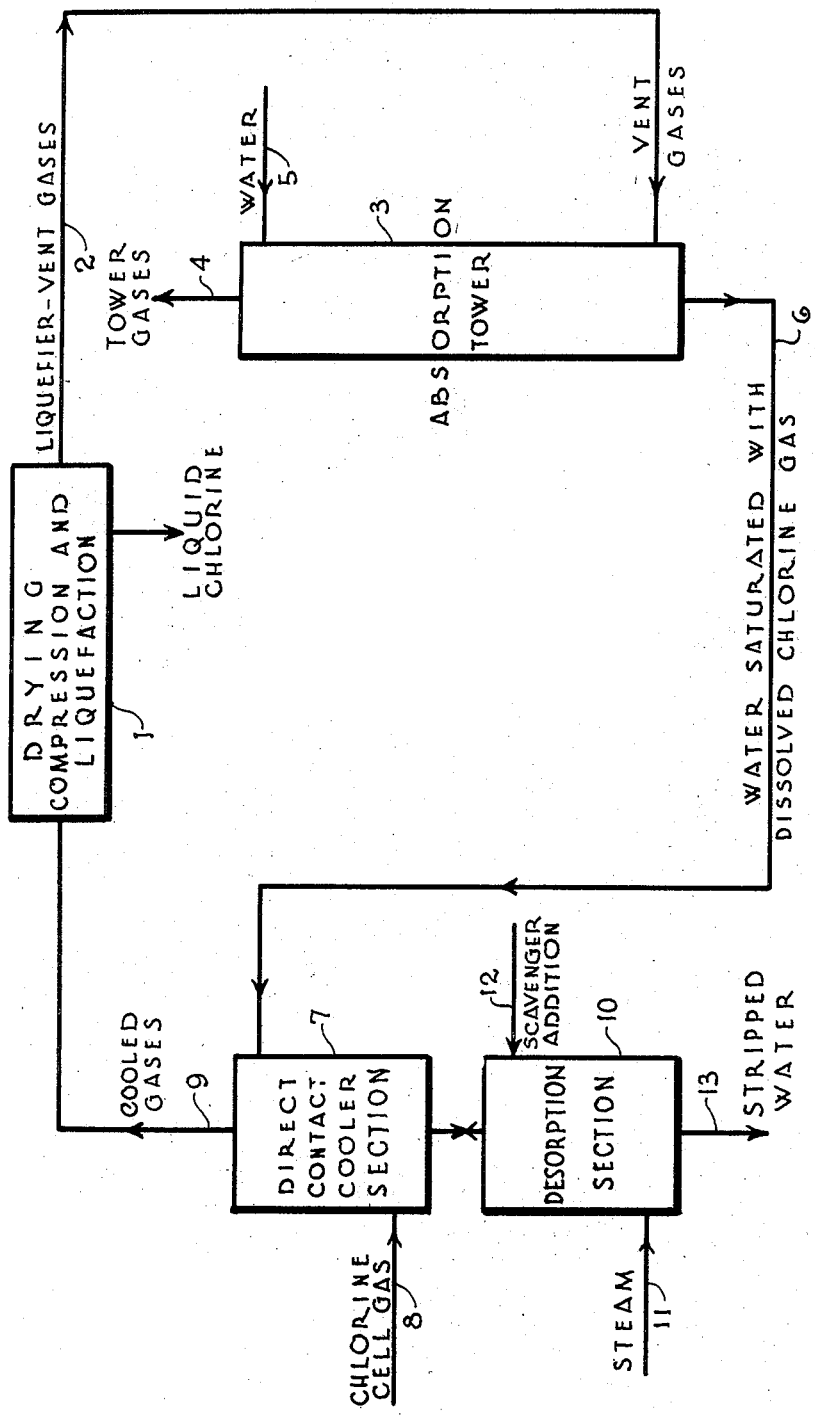

United States Patent Office 2,861,040
Patented Nov. 18, 1958

2,861,040

REMOVAL OF CHLORINE FROM CHLORINE-WATER SOLUTIONS

Donald A. Buchanan, Queenston, Ontario, Canada, and Robert H. Miller, Tonawanda, and Joseph E. Thornberg, Niagara Falls, N. Y., assignors to Hooker Chemical Corporation, Niagara Falls, N. Y., a corporation of New York Application February 28, 1955, Serial No. 491,131

15 Claims. (Cl. 210—63)

This invention relates to the removal of chlorine from chlorine-water solutions. More particularly, this invention relates to the removal of residual chlorine from chlorine-water solutions using an oxidizable sulfur compound as a chlorine scavenger.

In the manufacture of chlorine by the electrolytic decomposition of brine or by chemical processes, the disposal of the chlorine-water effluent presents a problem. Due to the low concentration of chlorine in these waste solutions, a common practice in the industry is to release them into the sewers thereby contaminating streams, rivers and lakes with residual chlorine. But, with increased industrial expansion, more stringent governmental regulations regarding water pollution and the need for conserving resources, it becomes increasingly important to eliminate and recover residual chlorine from waste solutions prior to release into sewer systems.

It is the object of this invention to remove residual chlorine from chlorine-water solutions before disposal, such as in sewer systems, and thus reduce the pollution problem. Further, it is an object of this invention to remove residual chlorine from chlorine-water solutions in an economical and efficient manner. Other objects and advantages of this invention will become apparent to one skilled in the art upon further reading of this specification and the appended claims.

We have now found a method for the removal of residual chlorine from chlorine-water which comprises passing the chlorine-water through a chlorine desorption system, adding an oxidizable sulfur compound to the chlorine-water and separating the gaseous chlorine and the dechlorinated water so produced. Also, we have found that the process of this invention is adaptable for use in commercial electroyltic chlorine-caustic installations employing a chlorine recovery system, consisting of an absorption tower, a direct contact chlorine cooler, a chlorine desorption system to reduce the residual chlorine by adding an oxidizable sulfur compound and separating the gaseous chlorine and dechlorinated water so produced.

As used herein, residual chlorine is the total amount of chlorine (combined and free available chlorine) remaining in water, sewerage or industrial wastes at equilibrium.

In chlorine-water solutions, hydrochloric acid and hypochlorous acid exist presumably in accordance with the following equation:

(1) $Cl_2 + H_2O \rightleftharpoons 2H^+ + ClO^- + Cl^-$

In this reaction one atom of chlorine is oxidized to a positive valence of one and another atom of chlorine is reduced to a negative valence of one. As this is a reversible reaction, changing the proportions causes the reaction to proceed in one or the other direction. The Reaction 1 is favored by the presence of hydroxide ions and hindered by the presence of hydrogen ions as shown in Equation 2.

(2)  $Cl_2 + 2OH^- \rightarrow Cl^- + ClO^- + H_2O$

The removal of the $ClO^-$ ion is important as active chlorine is twice the $ClO^-$ concentration because of its oxidation potential. An agent which will react with water in the presence of chlorine and in addition will produce hydrogen ions, thus reducing the residual chlorine content by removing chlorine and the $ClO^-$ ion is desirable.

We have found that such an agent is sulfur in oxidizable form. Sulfur reacts with water in the presence of chlorine as follows:

(3) 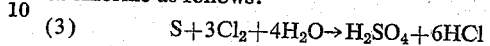 $S + 3Cl_2 + 4H_2O \rightarrow H_2SO_4 + 6HCl$

Because of the practical difficulty of supplying ordinary elemental sulfur, it is preferred to use a water soluble compound having a reducing reaction which reacts with chlorine and water in the same way as sulfur, to reduce the residual chlorine content by removing chlorine and the $ClO^-$ ion. Any compound of sulfur having slight solubility in water and containing incompletely oxidized sulfur, or having a reducing action under the conditions of use, comes within the scope of our invention, the small quantity required making it possible to use materials of very low solubility. Among the compounds of sulfur suitable for our purpose are the alkali metal sulfides, polysulfides, sulfites, hyposulfides, thiosulfates, pyrosulfites, etc.

As compounds highest in sulfur and lowest in oxygen are to be preferred the following example, using sodium tetrasulfide, is illustrative of a specific embodiment practiced within the scope of our invention but is not to be construed as limiting.

(4) 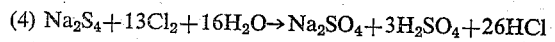 $Na_2S_4 + 13Cl_2 + 16H_2O \rightarrow Na_2SO_4 + 3H_2SO_4 + 26HCl$ For every mole of sodium tetrasulfide, 13 moles of active chlorine are removed, causing Reaction 1 to proceed from the right to the left. Further, 32 hydrogen ions are formed from one mole of sodium tetrasulfide. Thus, the action of tetrasulfide or any oxidizable sulfur compounds is twofold, the compound consumes active chlorine putting it in the inactive form, and through the common ion effect ($H^+$) drives chlorine out of solution and reduces the relatively stable of $ClO^-$ ion concentration.

Figure 2:
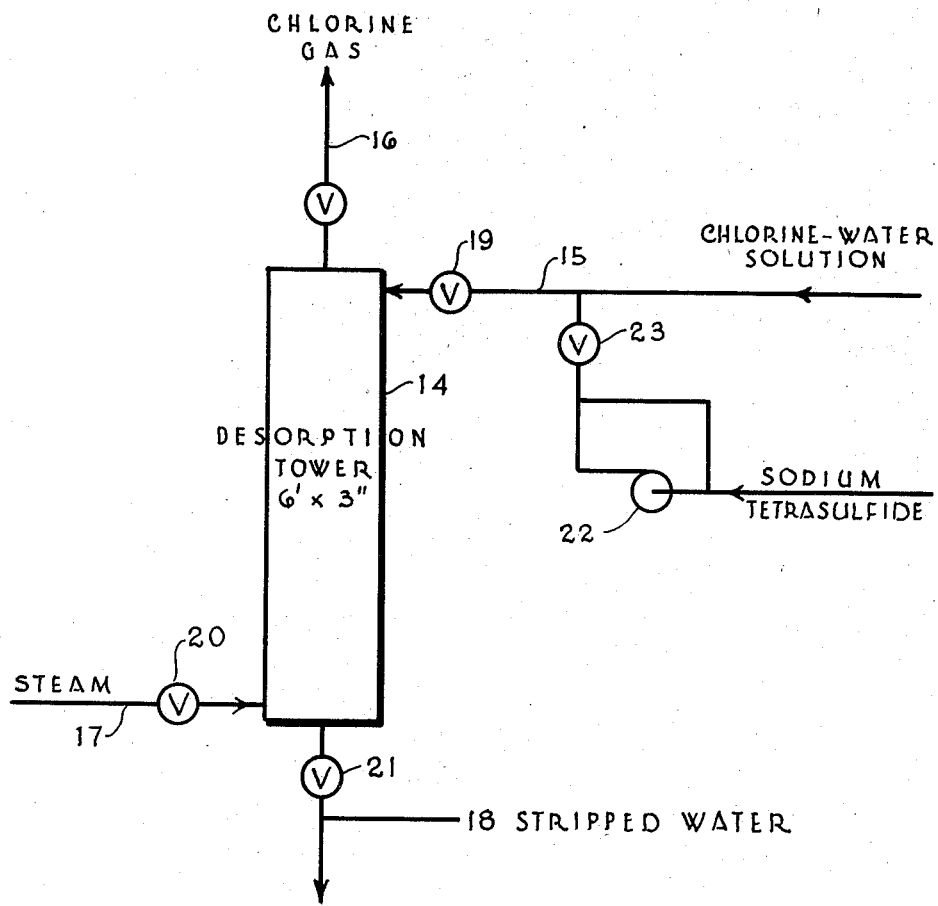

This invention will be more fully described with reference to the drawings of which Figure 1 is a diagrammatic flow sheet of an overall process including a preferred embodiment of this invention. Figure 2 is a diagrammatic sketch of a more specific embodiment. These drawings are illustrative and are not to be construed as limiting our invention except as defined by the appended claims.

Referring to Figure 1: Liquefier vent gases 2 recovered from the drying, compression and liquefaction step 1 are sent to a chlorine-water absorption tower 3. Here, chlorine and carbon dioxide contained in the vent gases are absorbed in water introduced at 5 under pressure, while chlorine-free gases are vented (4) to the atmosphere. The chlorine-water solution 6 from the absorber tower is passed into the direct contact cooler section 7. By releasing the pressure of the chlorine-water solution some gaseous chlorine is liberated and the chlorine-water solution cools the chlorine gases entering at 8. Then, these mixed gases 9 pass out of the direct contact tower section 7 into the drying, compression, and liquefaction system 1 where liquid chlorine is recovered as a saleable product. The chlorine-water from the direct contact cooler section passes down into the desorption section 10 of the tower, where steam is introduced (11) at the bottom and which maintains the chlorine-water at a temperature of above about 90 degrees centigrade. The amount of residual chlorine is lowered by the addition 12 of an oxidizable sulfur compound as a chlorine scavenger in the stream of chlorine-water. The chlorine gas which is thereby liberated passes up the tower leaving with the mixed gases 9. The stripped warm water 13 leaving the tower may be discarded or used in a hot water process.

Although the diagrammatic flow sheet (Figure 1) shows the desorption step using one column, alternatively more than one desorption column may be used in effecting the process of this invention. For example, the chlorine scavenger section may be a separate chlorine-resistant lined vessel through which effluent steam-stripped water from a primary steam-stripping column passes and to which an oxidizable sulfur compound is added—the temperature of this scavenger section being maintained the same as that used in the steam-stripping column.

Referring to Figure 2 which depicts the apparatus employed in Examples 1 and 2: A glass column 14 (6 feet in height with a three inch diameter) is packed with ½ inch Beryl saddles. The column contained an inlet and an outlet at both the top and the bottom. The inlet at the top 15 served as a feed point for the chlorine-water solution containing the scavenger. The outlet at the top 16 was used for the removal of the chlorine gas released in desorption. The bottom inlet 17 was the feed point for the steam, while the bottom outlet 18 carried the stripped warm water to the sewer.

*Example 1.—Desorption system-steam stripping*

Chlorine-water solution was fed (15) into the top of the column. The temperature of the feed, recorded at the entrance to the column, was between 60 and 100 degrees centigrade. The valve 19 on the feed line was then adjusted to give a pre-determined flow.

The steam valve 20 to the column was then opened and the desired flow determined by the ratio of pounds of chlorine-water per pound of steam desired. The volume of water in the column was controlled by the exit valve at the bottom of the column 21. When the system had reached equilibrium which required approximately 10 minutes, sufficient data were taken to determine the ratio of pounds of chlorine-water per pound of steam employed (W/S ratio) and a sample of the water leaving the column was taken and analyzed for residual chlorine by means of the standard starch-iodide test and is reported in parts per million (p. p. m.). These data follow:

| W/S ratio: | Residual chlorine in p. p. m. |
|---|---|
| 57 | 2,760 |
| 47.4 | 2,410 |
| 43.3 | 1,840 |
| 33 | 1,520 |
| 25.5 | 1,350 |
| 19.8 | 1,200 |
| 17.3 | 1,170 |
| 11 | 1,130 |
| 8.5 | 920 |
| 8.0 | 885 |
| 6.6 | 743 |
| 5.0 | 638 |
| 4.5 | 532 |
| 2.9 | 106 |
| 2.5 | 71 |
| 2.1 | 35 |
| 1.9 | 10 |

*Example 2.—Desorption system—steam and sodium tetrasulfide*

The apparatus and procedure was the same as that used in Example 1 with the following additions: A proportioning pump 22, was attached to the chlorine-water feed line 15. Through this pump was metered 23 200 parts of sodium tetrasulfide per million parts of chlorine-water fed to the desorber tower. The data accumulated are as follows:

| W/S ratio: | Residual chlorine in p. p. m. |
|---|---|
| 61.8 | 2,230 |
| 57.8 | 530 |
| 50.2 | 400 |
| 38.7 | 369 |
| 36.5 | 57 |
| 31.8 | 4 |
| 27.5 | 4 |
| 15.5 | 4 |
| 12.3 | 4 |
| 12.3 | 4 |

A ratio of about 33 or more pounds of water per pound of steam is considered economical in commercial operations today. Examination of the data of Example 1 show that when a steam ratio of 33 to 1 is used for stripping chlorine from chlorine-water the stripped water contains approximately 1,520 p. p. m. of residual chlorine.

The data of Example 2 show that in the process of this invention where the temperature of the chlorine-water solution is maintained by steam at 60 to 100 degrees centigrade measured at the point of addition of the scavenger, the addition of approximately 200 parts per million of sodium tetrasulfide reduces the residual chlorine content in the exit stream to approximately 4 p. p. m. In the process of this invention for the desorption of chlorine from chlorine-water solution any feed temperature between 60 and 100 degrees centigrade is suitable although the preferred range is 90 to 100 degrees centigrade. Also, it is practical to use any pressure, but it is more economical to use atmospheric pressure, although lower pressures may be used.

The amount of the chlorine scavenger, such as sodium tetrasulfide, added to the chlorine-water is dependent upon the economics of the water to steam ratio vs. the parts per million of scavenger addition. For example, if the addition of sodium tetrasulfide is reduced from 200 parts per million to 130 parts per million and the same residual chlorine content is maintained the water-steam ratio must be decreased from 35 to 30 thus increasing the cost per day of steam which does not compensate for the decrease in cost of sodium tetrasulfide. Therefore, the overall cost remains less for the addition of the increased amount of sodium tetrasulfide. The chlorine scavenger addition may be added to the chlorine-water solution in a desorption system or it may be added to the chlorine-water solution in a separate vessel and added to the desorption system.

In the operation of this process, it has been found that the desorption system may be constructed from any of the usual standard materials used for handling wet chlorine at temperatures below 100 degrees centigrade. Examples of these materials are glass, Pyrex, rubber, plastic lined steel, or corrosion resistant materials such as Haveg. Packing may be made of any material which provides adequate distribution and surface characteristics and is resistant to wet chlorine, for example ½ inch ceramic ring packing.

We claim:

1. In a method for removal of residual chlorine from chlorine-water wherein said chlorine-water is passed through a desorption system, the improvement which comprises: adding an oxidizable sulfur compound to said chlorine-water being maintained at a temperature between about 60 and 100 degrees centigrade and separating the gaseous chlorine and the dechlorinated water so produced.

2. The method of claim 1 wherein the oxidizable sulfur compound is an alkali metal sulfide.

3. The method of claim 2 wherein the alkali metal sulfide is a polysulfide.

4. The method of claim 3 wherein the alkali metal polysulfide is an alkali metal tetrasulfide.

5. The method of claim 3 wherein the alkali metal is sodium.

6. The method of claim 4 wherein the alkali metal polysulfide is sodium tetrasulfide.

7. The method of claim 1 wherein the oxidizable sulfur compound is an alkali metal thiosulfate.

8. The method of claim 1 wherein the oxidizable sulfur compound is an alkali metal sulfite.

9. The method of claim 1 wherein the oxidizable sulfur compound is an alkali metal pyrosulfite.

10. The method of claim 1 wherein the oxidizable sulfur compound is an alkali metal hyposulfide.

11. A method for the removal of residual chlorine from chlorine-water, produced in commercial electrolytic caustic-chlorine installations, which comprises: passing the chlorine-water through a chlorine desorption system maintained between about 60 and 100 degrees centigrade, adding an oxidizable sulfur compound thereto, and separating the gaseous chlorine and the dechlorinated water so produced.

12. The method of claim 11 wherein the oxidizable sulfur compound is an alkali metal tetrasulfide.

13. The method of claim 12 wherein the alkali metal tetrasulfide is sodium tetrasulfide.

14. A method for the removal of residual chlorine from chlorine-water produced in commercial electrolytic caustic-chlorine installations which comprises: recovering chlorine in a water absorption system, passing the chlorine-water so produced through a direct contact chlorine cooler, then through a chlorine desorption system maintained between about 60 and 100 degrees centigrade, adding an oxidizable sulfur compound thereto, and separating the gaseous chlorine and the dechlorinated water so produced.

15. The method of claim 14 wherein the oxidizable sulfur compound is sodium tetrasulfide.

References Cited in the file of this patent

UNITED STATES PATENTS

| | | |
|---|---|---|
| 1,781,830 | Barstow | Nov. 18, 1930 |
| 2,258,771 | Klingelhoefer | Oct. 14, 1941 |
| 2,258,772 | Klingelhoefer | Oct. 14, 1941 |
| 2,398,891 | Julien et al. | Apr. 23, 1946 |
| 2,540,905 | Neubauer | Feb. 6, 1951 |
| 2,547,928 | Davis et al. | Apr. 10, 1951 |
| 2,750,002 | Hooker | June 12, 1956 |

OTHER REFERENCES

Encyclopedia of Chemical Reactions, C. A. Jacobson, vol. II, 689, Reinhold Pub. Co. (N. Y.) (1948).